April 9, 1968     D. W. MILAM ET AL     3,377,476

ILLUMINATING UNIT FOR COMPACTS

Filed June 17, 1966     2 Sheets-Sheet 1

INVENTORS
DENNIS W. MILAM,
FLOYD W. TRACY,
BY
Berman, Davidson + Berman
ATTORNEYS.

April 9, 1968 D. W. MILAM ET AL 3,377,476
ILLUMINATING UNIT FOR COMPACTS
Filed June 17, 1966 2 Sheets-Sheet 2
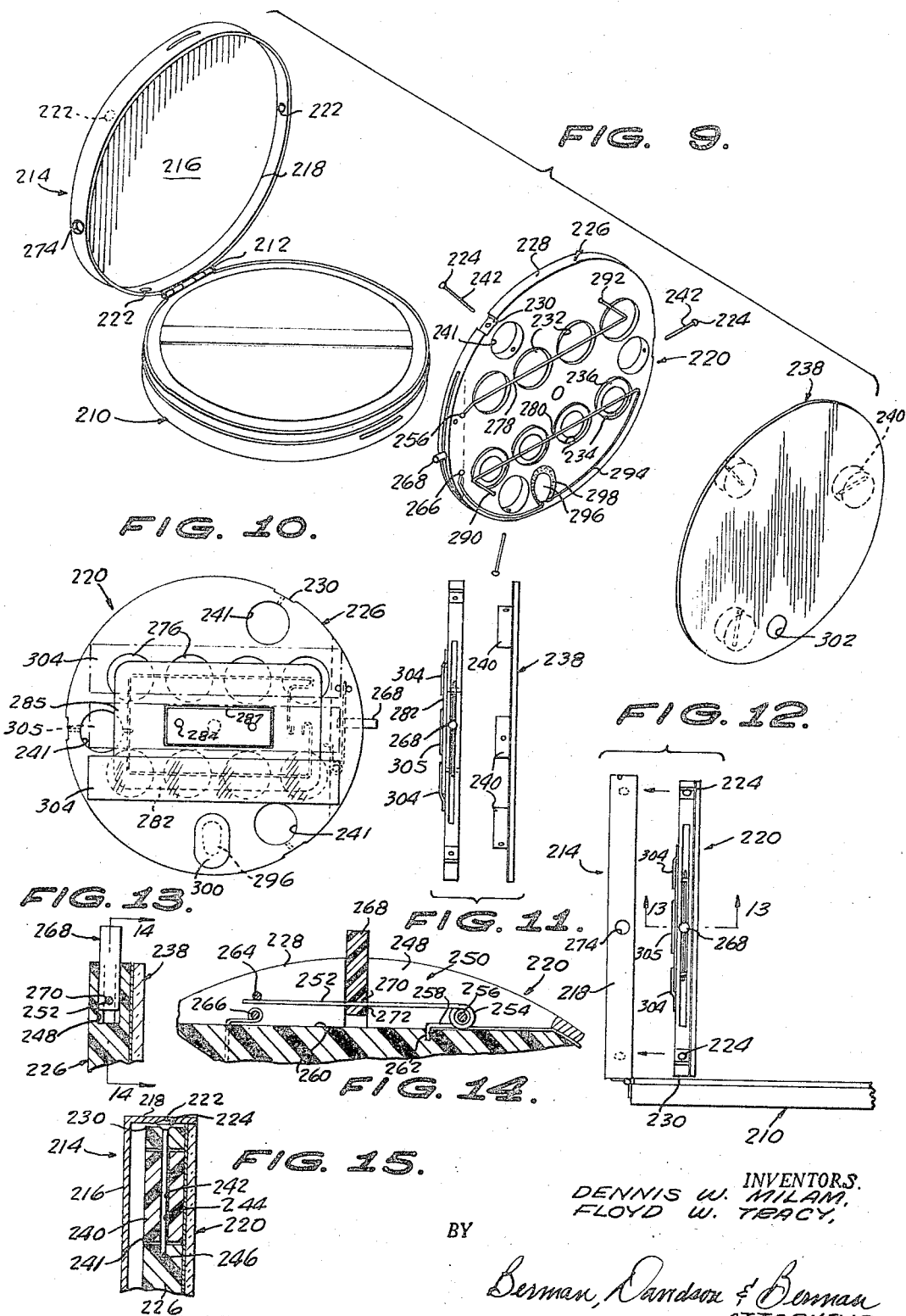
INVENTORS.
DENNIS W. MILAM,
FLOYD W. TRACY,
BY
Berman, Davidson & Berman
ATTORNEYS.

United States Patent Office 3,377,476
Patented Apr. 9, 1968

3,377,476
ILLUMINATING UNIT FOR COMPACTS
Dennis W. Milam, Los Angeles, Calif. (5680 Sawtelle Blvd., Apt. J, Culver City, Calif. 90230), and Floyd W. Tracy, Los Angeles, Calif. (29123 Ocean Ridge Drive, Palos Verdes, Peninsula, Calif. 90724)
Filed June 17, 1966, Ser. No. 558,444
7 Claims. (Cl. 240—6.45)

ABSTRACT OF THE DISCLOSURE

A compact having hingedly connected and registering container and mirror sections. A mirror, battery holder of dielectric material and a sheet of dielectric material removable as a single unit. A light bulb mounted in the holder behind the mirror with a switch connecting the batteries.

---

This invention relates to electrically illuminated compacts composed of mirror sections and container sections, hinged together, the electrical illuminating components being entirely contained in the mirror sections.

The primary object of the invention is the provision of slimmer, less bulky, more efficient, and more practical compacts of the kind indicated, which are more readily adaptable to being given different decorative shapes and designs.

Another object of the invention is the provision, in compacts of the character described above, of combination mirror and electrical illuminating component units, adapted to snap into and be entirely contained in the mirror sections, in the interest of compactness and practicality, and to the end that the container sections be free and unencumbered for maximum capacity and accessibility.

A further object of the invention is the provision, in compacts of the character indicated above, of thin and flat electrical illuminating components which are more efficient and reliable, have maximum ruggedness and reliability and low profile are easy of access for changing batteries, and are of minimal weight.

A still further object of the invention is the provision of low cost electrical illuminating components of the character indicated above, which are composed of a minimum number of simple and uncomplicated parts, and which are operated by push buttons which are endwise movable and are edge-mounted in the mirror sections of the compacts.

In the drawings:

FIGURE 9 is an exploded perspective view of another form of compact, of flat, low profile, embodying the present invention;

FIGURE 10 is a plan view of the snap-in combination mirror and illuminating unit removed from the mirror section of FIGURE 9;

FIGURE 11 is a group edge elevation of FIGURE 10, showing the cover separated from the unit;

FIGURE 12 is a fragmentary side elevation of the compact of FIGURE 9, showing said unit removed from the mirror section of the compact;

FIGURE 13 is an enlarged fragmentary section, taken on the line 13—13 of FIGURE 12;

FIGURE 14 is a fragmentary section, taken on the line 14—14 of FIGURE 13; and,

FIGURE 15 is an enlarged fragmentary section, showing the means for securing the combination mirror and illuminating unit in the mirror section.

Referring in detail to the drawings, and first to FIGURES 1 to 8 thereof, the illustrated compact comprises a circular container section 10, and a similarly circular mirror section 12, hinged together, at edges thereof, as indicated at 14, to register with each other when the sections are closed. The container section 10 is internally equipped with the usual accessories.

The mirror section 12 is domed or of convex-concave cross-section, the concavity 16 of this section providing for reception of a removable mirror and electrical illuminating unit 18.

Figure 1:
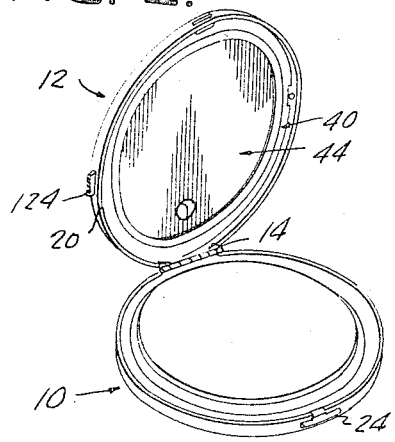
FIGURE 1 is a perspective view of a compact of the present invention, having a domed or convex-concave mirror section, showing the same in open position.
Figure 2:
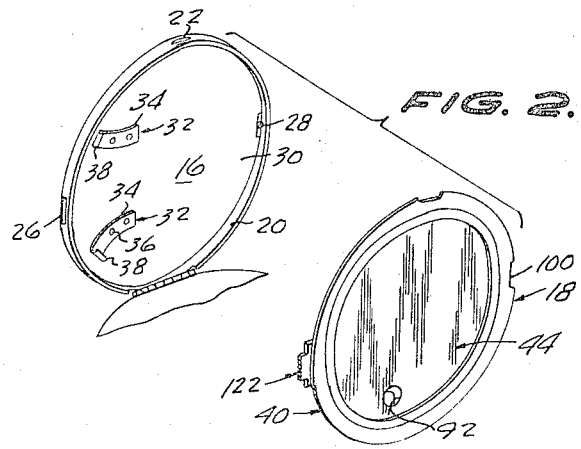
FIGURE 2 is an exploded and fragmentary perspective view, showing the snap-in combination mirror and illuminating unit removed from the mirror section of the compact.

As shown in FIGURE 2, the mirror section 12 has a rim 20 extending at the concave side thereof, which, at a location opposite the hinge 14, is formed with an external lug 22, adapted to cooperate with a spring-loaded catch 24, on the rim of the container section 10.

The mirror section rim 20 is provided, on its left-hand side, at 90 degrees from the lug 22, with a circumferentially elongated slot 26, which accommodates the switch button, as hereinafter set forth. At the side of the rim 20, opposite the slot 26, is a similar but smaller slot 28, adapted to receive a retaining member of the unit 18, as also hereinafter set forth. The web 30, of the mirror section 10, is provided, on its inner concave side 16, with a pair of spring catches 32, each of which comprises a spring strip having a shank 34 fixed, as indicated at 36, to the side 16, and terminating, at their outer ends, in return bent hooks 38, the hooks 38 being spaced apart and located in closely spaced relation to the rim 20. The hooks 38 are provided to retainably and releasably engage portions of the unit 18, as hereinafter set forth.

The unit 18 comprises an annular metal mirror frame 40, of an internal diameter to fit within the rim 20 of the mirror section 10, which is provided on its underside with a hook flange 42, on the inner edge of the mirror frame (see FIGURES 4 and 7), behind which the edge of a circular mirror 44 is engaged.

A relatively thick plastic material dielectric battery holder disc 46, smaller in diameter than the mirror frame 40, is engaged with the upper side thereof, and is thereby spaced from the back of the mirror 44, with a relatively thin dielectric disc 48 interposed between the disc 46 and the mirror. The disc 46 is held in place on the frame 40, as by means of screws 50.

The holder disc 46 is formed with two parallel spaced rows of battery openings 52, 53 adapted to removably receive flat circular miniature batteries 54 having contacts 56 and 58, on opposite ends thereof. The holes 52, 53 are formed so that one row thereof will only accommodate batteries with one reduced diameter contact received thereon, and the other row will accommodate larger diameter contacts of batteries, so that the batteries cannot be incorrectly installed.

A generally rectangular plastic material cover 60, dimensioned to cover and hold the batteries removably in place, overlies the batteries, and has headed pins 62, adapted to snap into holes 64, provided in the holder disc 46 between the rows of battery openings 52, 53.

Figure 8:
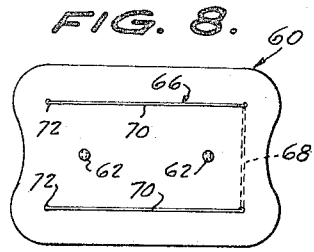
FIGURE 8 is a botom plan view of the cover.

As shown in FIGURE 8, the underside of the cover 60 has affixed thereto a U-shaped fine-gauge wire 66, the cross member 68 of which is suitably sealed in the cover, the legs 70 of this wire being exposed, and suitably secured to the cover, at their ends, as indicated at 72. The wire 66 is electrically related to other electrical elements, located on and secured to the opposite side of the disc 46.

On the narrow side of the holder disc 46 are suitably affixed parallel spaced chordally arranged fine gauged wires, including a straight wire 74, and a wire 76, having a straight portion 78, paralleling the wire 74, and an arcuate portion 80. The single wire 74 and the straight wire portion 78, like the legs of the wire 66, lie diametrically across the battery openings of the disc 46, for electrical engagement with related contacts of the batteries.

The straight wire 74 terminates, at one end, in a laterally angled terminal 82, which, at its free end, is suitably secured to the disc 46, as indicated at 84. The opposite end of the straight wire portion 78 is similarly secured to the disc 46, as indicated at 85. The arcuate wire portion 80 parallels the rim of the disc 46, and, at its free end, is connected to a switch 86. Connected in the arcuate wire portion 80, at a point intermediate its ends, is a bulb socket 88, in which is engaged a removable electric bulb 90, which is exposed through a registered opening 92, provided in the mirror 44. A foil reflector 93 for the bulb 90, serving to increase its lighting effect, is disposed behind the bulb and is suitably secured to the disc 46.

Suitably secured, as indicated at 94, to the top of the holder disc 46, at a point between the rows of battery openings, is a spring metal plate 96, which has a rolled spring catch 98 which is exposed in a slot 100 in the peripheral edge of the mirror frame. The latch 98 cooperates with the smaller slot 28 in the rim 20 of the mirror section 12.

At a location opposite to the catch 98, the edge of the holder disc 46 is formed with a relatively deep, circumferentially elongated notch 102, at opposite sides of which are reduced thickness edge portions 104, with which the hooks 38 of the catches 32 cooperate.

The related ends of the wire 74 and the arcuate wire portion 80 are electrically connected to components of the switch 86, located in the holder plate notch 102. The switch 86 comprises a contact point 106 fixed in location at one end of the edge 108 of the notch 102, to which the wire 66 is connected, from which is normally disengaged, in the open position of the switch, a conductive spring arm 110, as shown in FIGURE 3.

Figure 3:
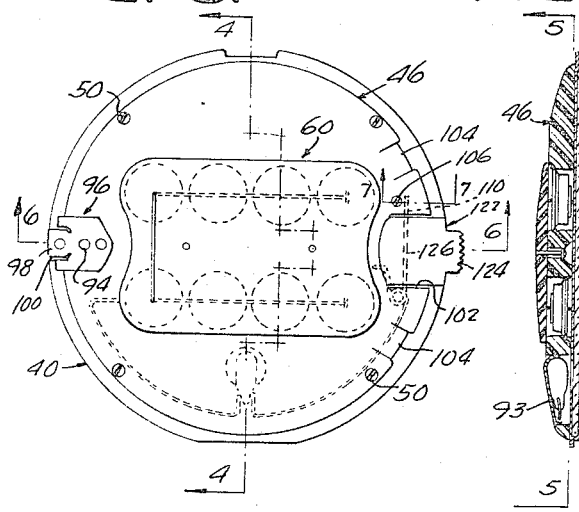
FIGURE 3 is an enlarged plan view of the said combination unit, showing internal elements thereof in phantom lines, with its cover in place.
Figure 4:
FIGURE 4 is a section, taken on line 4—4 of FIGURE 3.
Figure 5:
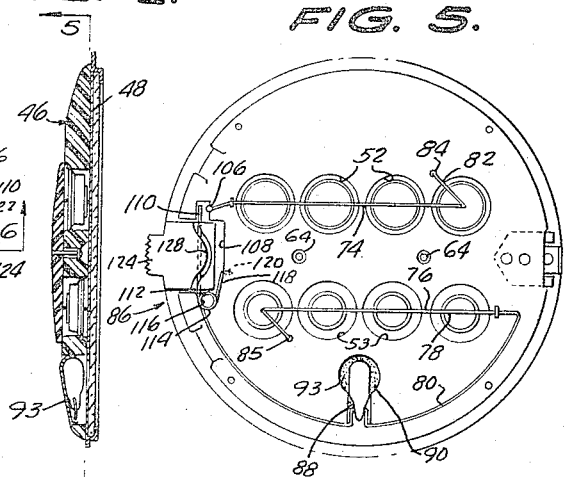
FIGURE 5 is a plan view of the illuminating unit with the dielectric cover member therefor removed, FIGURE 5 being taken substantially on the vertical plane of line 5—5 of FIGURE 4, looking in the direction of the arrows.
Figure 6:
FIGURE 6 is a section, taken on the line 6—6 of FIGURE 3.
Figure 6:
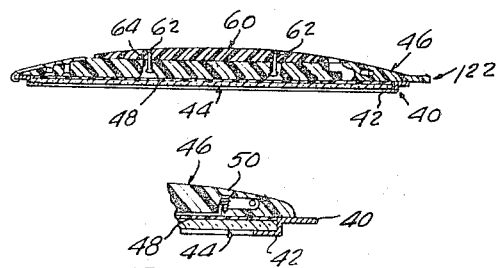
Figure 7:
FIGURE 7 is a fragmentary section, taken on the line 7—7 of FIGURE 3.

The conductive arm 110, as shown in FIGURES 3 and 4, is the long arm of a U-shaped portion 112, having a coiled cross member 114, which is securably engaged around a post 116, which is a part of the disc 46, and is located at the end of the notch 102 remote from the contact point 106. The U-shaped portion 112 has a short leg 118 which has a lateral terminal 120, on its free end, which is suitably anchored to the bottom of the notch 102.

A flat plastic material push button 122, narrower than the notch 102, is disposed in and normally projects radially outwardly from the notch and from the edge of the mirror frame 40, and has a reduced, knurled finger-piece 124, on its outer end, which extends freely through the larger notch 26 of the rim 20 of the mirror section 12.

The push button 122 is formed, in its underside, with a transverse groove 126, in which the intermediate part of the switch arm 110 lies freely, the groove 126 being partially crossed by a small centered bridge 128, by means of which the push button is operatively and supportably connected to the switch arm 110.

In operation, the batteries 54 having been installed in the battery openings 52, 53 of the holder disc 46, with their contacts in proper polarity relationship to the related ones of the wires, and the unit 18 having been snapped into place in the mirror section 12, inward pressure exerted on the exposed fingerpiece 124 of the push button 96, serves to force the switch arm 110 inwardly, against its inherent resistance, so that the free end of the switch arm is made to engage the switch contact point 106, and complete the electrical circuit, whereby the electric bulb 90 is illuminated, and its light passes through the mirror hole 92 to illuminate the face of the user of the compact.

The flat, low profile compact shown in FIGURES 9 to 15, is composed of a flat circular, pan-shaped container section 210, to which is hinged, at 212, a flat circular, pan-shaped mirror section 214 having a flat top wall 216 and a flat circular rim 218.

A flat, low profile combination mirror and electrical illuminating unit 220 is removably engaged in the mirror section 214. As shown in FIGURE 15, the mirror section rim 218 is formed, at at least three circumferentially spaced locations, with internal indentations 222, into which are adapted to be retainably snapped rivet head detents 224, on the edge of the unit 220.

The unit 220 comprises a circular flat, relatively thin dielectric material battery holder disc 226, of a diameter to fit snugly within the mirror section rim 219, and having a continuous peripheral edge 228, broken only by spaced shallow notches 230, from whose bottoms project the detents 224, which are adapted to snap into the indentations 222.

The disc 226 is formed therethrough with two parallel spaced chordal lines of battery receiving openings 232 and 234, which are formed with oppositely facing grooves 236, which provide seats for the larger diameter sides of the batteries, with the smaller diameter sides of the batteries extending through the holes, and being thereby exposed at opposite sides of the disc.

A circular disc mirror 238, of the same diameter as the disc 226, is removably secured to the front side thereof, by means of circumferentially spaced cylindrical studs 240, on its rear side, which are plug-fitted into holes 241, provided in the disc 226. As shown in FIGURE 15, the studs 240 are held in place by pins 242, which extend through bores 244, in the studs, and into blind bores 246, in the inner sidewalls of the holes 242, the pins being removable merely by grasping and pulling out on their detent heads 224.

The peripheral edge 228 of the disc 226 is formed, as shown in FIGURES 13 and 14, with a chordal slot 248, in which a switch 250 is located. The switch 250 comprises a spring wire arm 252, extending lengthwise of the slot 248, which, at its anchored end, is coiled, as indicated at 254, around an anchor pin 256, extending across the slot, the coil 254 eventuating in a short longitudinal arm 258, which bears against the bottom 260, of the slot 248, and has a lateral terminal 262 which is embedded in the bottom 260.

At the outward side of the free end of the switch arm 252 is located a stop pin 264, extending across the slot 248, against which the arm 252 is normally biased, in the open position of the switch 250. Spaced inwardly from the stop pin 264, at the inner side of the arm 252, is a contact pin 266, extending across the slot 248, with which the free end of the switch arm is adapted to make contact, in the closed position of the switch 250.

A radially elongated push button 268 has a transverse bore 270, at its inner end, through which the switch arm 252 extends freely, the ends of the bore 270 being flared, as indicated at 272, to provide for limited freedom of the pushbutton to rock, relative to the switch arm. As shown in FIGURE 13, the pushbutton is slidably confined between the opposed walls of the slot 248, and normally extends out of the slot, and outwardly through an accommodating opening 274, provided in the rim 218, of the mirror section 214. Pushing inwardly on the pushbutton closes the switch 250 and energizes the electric bulb, as herein set forth.

At the front side of the disc 226, the batteries 276 are held in place in their seats by, and make electrical contact with, chordally arranged wires 278 and 280, of the illuminating circuit. A flat rectangular dielectric plate 282, disposed along the center of the disc 226, is permanently fixed thereto, as indicated at 284. The dielectric plate 285 has a center opening 287 which receives the wired plate 282, so as to be centered relative to the disc 226. Outer adhesive tapes 304, and a center tape 305 adhered to the plate 282, extend across the plate 282 and are adhered to the disc, so as to hold the plate 282 and the batteries in place.

As shown in FIGURE 9, the wire 278 is connected, at one end, to the switch arm anchor pin 256. The adjacent end of the other wire 280 is anchored to the disc 226, as indicated at 290. The opposite end of the wire 278 is similarly anchored, as indicated at 292. The end of the wire 280, remote from the switch 250, merges into an arcuate wire portion 294, which is suitably secured to the front of the disc, and extends around its peripheral edge. The arcuate wire portion 294 is connected to the switch contact 266.

At the middle of the arcuate wire portion 294, the same is interrupted and connected to the opposed contacts of a miniature electric bulb 296, located in and suitably secured in place in a recess 298 in the front of the disc 226, with a piece of foil 300 positioned behind it, as a reflector. The mirror 238 is provided, registered with the bulb 296, with a light passing opening 302, which can be in the form of removal of a part of the reflecting backing of the mirror.

What is claimed is:

1. A compact comprising hingedly connected and registering container and mirror sections, said mirror section having a peripheral rim projecting toward the container section and defining on the inner side of the mirror section a chamber and a unit removably engaged in said chamber, said unit comprising an annular mirror frame in which the mirroor is engaged, a dielectric battery holder disc secured to the mirror frame, said holder disc being formed with opposed first and second rows of battery openings adapted to receive batteries, and a cover removably connected to the holder disc and overlying the batteries, another dilectric disc interposed between the mirror and the mirror frame and the holder disc and extending across the first and second battery openings of the holder disc, first wire means secured to the side of the cover adjacent the holder disc, said first wire means having legs exposed in the battery openings, second wire means secured to the side of the holder disc adjacent to said other disc, said second wire means having a first wire portion extending across the second row of battery openings and not extending across the first row of battery openings, said second wire means having an arcuate portion extending from one end of said first wire portion around the edge of the holder disc, a bulb socket located on the holder disc adjacent to the edge thereof, said socket being connected in circuit with said arcuate wire portions, a switch, and related ends of the wire means being connected to said switch.

2. The compact of claim 1, wherein said unit comprises an annular mirror frame in which the mirror is engaged, a dielectric battery holder disc secured to the mirror frame, said holder disc being formed with opposed first and second rows of battery openings adapted to receive batteries, and a cover removably connected to the holder disc and overlying the batteries, said holder disc being formed with a peripheral notch in which a switch contact point is fixed, one of said wire means being connected to said contact point, a U-shaped conductive and resilient switch arm comprising a long arm extending lengthwise of said notch, said switch arm having a short arm anchored to the holder disc in said notch and a cross member anchored to the holder disc at the end of the notch remote from the contact point, said long arm having a free end normally retracted from said contact point, and a push button located in said notch, said button being loosely connected to said long arm.

3. A compact comprising hingedly connected and registering container and mirror sections, said mirror section having a peripheral rim projecting toward the container section and defining on the inner side of the mirror section a chamber, and a unit removably engaged in said chamber, said unit comprising a mirror formed with a light-passing area, an electric bulb mounted behind the mirror and exposed in said area, and an electric battery containing assembly behind and secured to the mirror and located in said chamber and electrically connected to the bulb, said assembly including a switch, said switch having a push button extending radially with respect to said unit, the mirror section rim being formed with an opening through which the switch button works, said unit consisting of a single flat dielectric disc having a peripheral edge, said disc being formed with a chordal slot opening to said peripheral edge, a radial push button located in said slot and slidably engaged with the sides of the slot, the rim of the mirror section being formed with an opening through which the push button extends.

4. The compact of claim 3 wherein said switch comprises a spring switch arm, an anchor pin extending across the slot to which one end of the switch arm is anchored, said switch arm having a free end, a stop pin extending across the slot at the outer side of the switch arm, said switch arm being biased to normally engage said stop pin, a contact pin extending across the slot at the inner side of the switch arm with which the switch arm is adapted to engage in the closed position of the switch, said push button having a transverse bore through which the switch arm extends.

5. The compact of claim 4 wherein said single disc is formed with circumferentially spaced stud openings, said mirror having studs engaged in said stud openings, and means securing the studs in the stud openings.

6. The compact of claim 5 wherein said means comprises radial pins extending inwardly from the peripheral edge of the disc, said studs having transverse bores through which the pins extend removably, said pins having heads on their outer ends exposed at the peripheral edge of the disc.

7. The compact of claim 6 wherein the rim of the mirror section is formed with circumferentially spaced internal indentations into which the pin heads are adapted to snap and hold the unit removably in place in the mirror section of the compact.

References Cited

UNITED STATES PATENTS

| 2,465,114 | 3/1949 | Oury | 240—10.65 |
| 2,536,484 | 1/1951 | Avery | 240—10.65 |
| 2,978,696 | 4/1961 | Keller et al. | 240—6.4 |
| 3,300,632 | 1/1967 | Kinn | 240—6.45 |
| 3,305,679 | 2/1967 | Barcita-Peruchena | 240—6.45 |

NORTON ANSHER, *Primary Examiner.*

J. W. PRICE, *Assistant Examiner.*